United States Patent
Luedtke

(10) Patent No.: US 9,724,997 B2
(45) Date of Patent: Aug. 8, 2017

(54) ELECTRIC MOTOR TEMPERATURE COMPENSATION

(75) Inventor: Daniel Luedtke, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 767 days.

(21) Appl. No.: 13/607,013

(22) Filed: Sep. 7, 2012

(65) Prior Publication Data

US 2014/0070739 A1 Mar. 13, 2014

(51) Int. Cl.
| | | |
|---|---|---|
| H02P 6/00 | (2016.01) |
| B60L 11/08 | (2006.01) |
| H02P 21/14 | (2016.01) |
| B60L 15/02 | (2006.01) |
| H02P 29/68 | (2016.01) |

(52) U.S. Cl.
CPC .......... B60L 11/08 (2013.01); B60L 15/025 (2013.01); H02P 21/14 (2013.01); H02P 29/68 (2016.02); B60L 2240/421 (2013.01); B60L 2240/423 (2013.01); B60L 2240/425 (2013.01); Y02T 10/643 (2013.01); Y02T 10/648 (2013.01); Y02T 10/70 (2013.01); Y02T 10/7077 (2013.01)

(58) Field of Classification Search
USPC ..... 318/400.01, 400.07, 432, 609, 415, 689, 318/721; 701/22; 180/65.285
See application file for complete search history.

(56) References Cited

U.S. PATENT DOCUMENTS

| | | | |
|---|---|---|---|
| 4,695,783 A * | 9/1987 | Shero et al. ................. 318/808 |
| 5,920,161 A | 7/1999 | Obara et al. |
| 7,068,526 B2 * | 6/2006 | Yamanaka et al. ............. 363/98 |
| 7,595,600 B2 | 9/2009 | Patel et al. |
| 7,772,791 B2 * | 8/2010 | Lim et al. ..................... 318/432 |
| 8,519,648 B2 * | 8/2013 | Gallegos-Lopez et al. ........................ 318/400.02 |
| 2002/0113615 A1 | 8/2002 | Atarashi |
| 2005/0128777 A1 | 6/2005 | Yamanaka et al. |
| 2007/0200529 A1 * | 8/2007 | Kaneko ................ B60L 11/123 318/801 |
| 2012/0139459 A1 * | 6/2012 | Lim et al. ................ 318/400.02 |
| 2012/0249024 A1 * | 10/2012 | Saha ....................... H02P 21/06 318/400.02 |

FOREIGN PATENT DOCUMENTS

| | | |
|---|---|---|
| CN | 1157065 A | 8/1997 |
| CN | 101604945 A | 12/2009 |
| CN | 102082533 A | 6/2011 |
| CN | 102522930 A | 6/2012 |

* cited by examiner

Primary Examiner — Eduardo Colon Santana
Assistant Examiner — Bickey Dhakal
(74) Attorney, Agent, or Firm — David B. Kelley; Brooks Kushman P.C.

(57) ABSTRACT

A vehicle includes one or more inverter-fed electric machines such as permanent magnet synchronous motors. In response to a torque request, a controller issues commands to an inverter calculated to cause the motor to produce the requested torque at the current temperature. A method adjusts the direct component of the winding current such that the requested torque is delivered efficiently. For a given rotor speed, bus voltage, and torque, the direct component increases as the temperature increases.

13 Claims, 5 Drawing Sheets

ELECTRIC MOTOR TEMPERATURE COMPENSATION

TECHNICAL FIELD

This disclosure relates to control of electric motors.

BACKGROUND

Permanent magnet synchronous motors (PMSMs) are utilized in various applications because they have generally favorable efficiency characteristics relative to other types of motors. Typically, PMSMs have three separate electrical windings within the stator which are each powered by alternating current (AC) voltages $V_a$, $V_b$, and $V_c$. In operation, the winding currents $I_a$, $I_b$, and $I_c$ each oscillate at a frequency proportional to the rotor speed and are separated by 120 degrees in phase from one another. These winding currents induce a rotating magnetic field which may be out of phase with the rotor. The resulting shaft torque depends upon both the magnitude of the magnetic field and the phase angle relative to the rotor. The magnetic properties of the permanent magnets are impacted by temperature which impacts the resulting torque. Accurate torque delivery requires compensation for the effects of temperature.

For convenience, the winding voltages and currents may be represented by vectors with respect to a rotating reference frame that rotates with the rotor. The mapping between rotor position and the rotating reference frame depends upon the number of poles in the motor. The voltage vector has a direct component $V_d$ and a quadrature component $V_q$. Similarly, the current has a direct component $I_d$ and a quadrature component $I_q$. $V_d$, $V_q$, $I_d$, and $I_q$ do not oscillate based on rotor position.

In certain applications, such as electric vehicles and hybrid electric vehicles, electrical power is available from a non-oscillating direct current (DC) voltage source such as a battery. Therefore, inverters are utilized to convert the non-oscillating voltage $V_{dc}$ into three oscillating voltages. Inverters contain a discrete number of switching devices and are therefore capable of supplying only a discrete number of voltage levels at each of the three motor terminals. For a 2-level inverter, at any moment in time, the switching devices are set to electrically connect each of the three AC motor terminals to either the positive or the negative DC terminal. Thus, eight switching states are available. Two of these switching states, in which all three AC terminals are connected to the same DC terminal, are called zero states. In the remaining six states, one AC terminal is connected to one of the DC terminals and the other two AC terminals are connected to the opposite DC terminal. The inverter is capable of switching rapidly among these eight states.

SUMMARY OF THE DISCLOSURE

In one embodiment, a method of compensating for temperature is disclosed. In response to a torque request, the method adjusts the torque request based on temperature. The direct and quadrature components of the winding current are calculated based on this adjusted torque request. The calculated direct component is further adjusted based on the temperature. Finally, commands are issued to an inverter to effectuate the target winding current. In some embodiments, the calculated direct component is not adjusted when the torque request is less than a threshold. The threshold may be based on rotor speed and bus voltage.

In another embodiment, a vehicle includes a bus, an electric machine such as a permanent magnet synchronous motor, an inverter, and a controller. The inverter is configured to supply the electric machine a winding current having a direct component ($I_d$) and a quadrature component ($I_q$). The controller is configured to issue pulse width modulation commands to the inverter to adjust the winding current such that for a given speed, torque, and voltage, the direct component increases as the temperature increases. The direct component may be less than zero at the given speed, torque, and voltage.

In another embodiment, a controller includes an input interface, an output interface, and control logic. The input interface receives signals indicating a voltage of an electrical bus and a temperature and a rotor speed of an electric machine. The output interface is configured to send pulse width modulation commands to an inverter causing the inverter to supply the electric machine with a winding current such that the electric machine produces torque. The control logic is programmed to adjust the pulse width modulation commands such that for a given rotor speed, bus voltage, and torque, the direct component increases as temperature increases. The direct component may be less than zero at the given speed, torque, and voltage.

DETAILED DESCRIPTION

Figure 3:
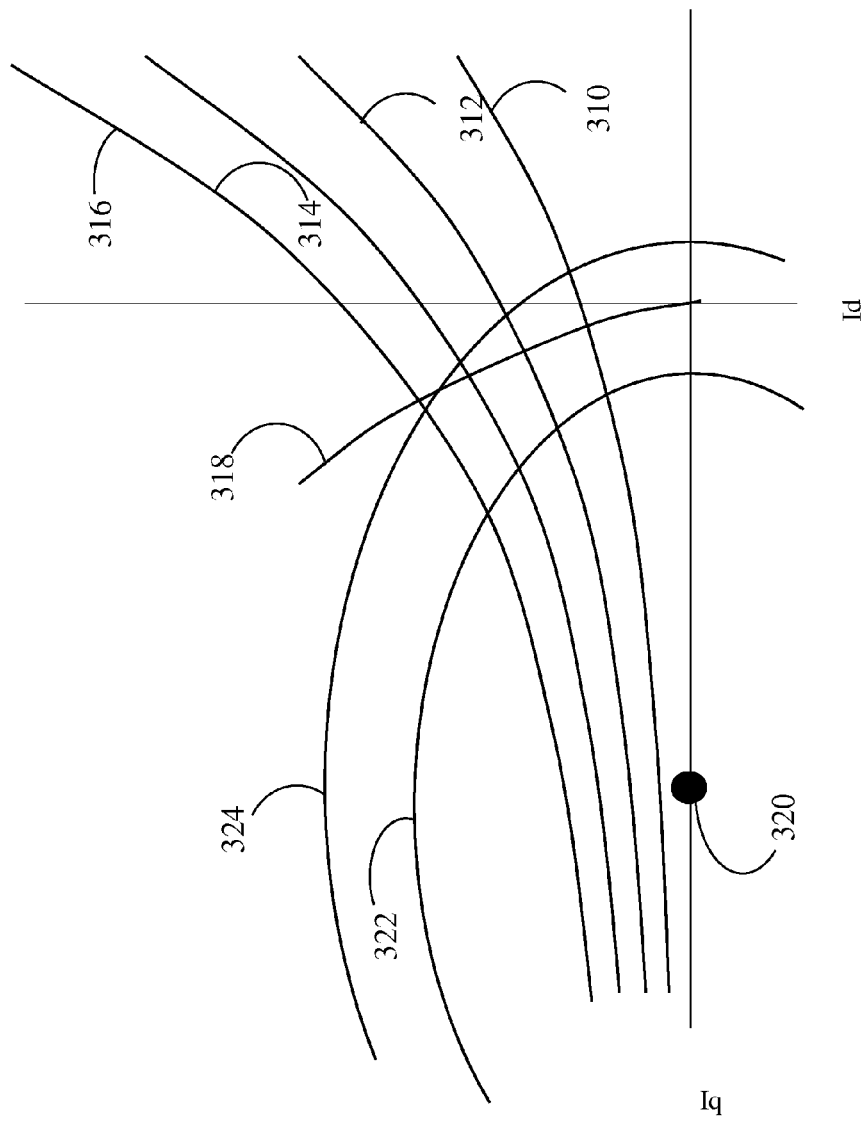
FIG. 3 is a graph of general characteristics of permanent magnet synchronous motors in terms of the direct and quadrature components of the winding current at a particular reference temperature.

FIG. 3 illustrates typical characteristics of an inverter-fed PMSM at a particular reference temperature with respect to the winding current in the rotor reference frame. In this Figure, the direct component $I_d$ is represented by the horizontal axis and the quadrature component $I_q$ is represented by the vertical axis. Curve 310 represents different combinations of $I_d$ and $I_q$ that would produce a particular output torque. Curves 312, 314, and 316 represent the combinations for progressively higher output torques. Although every point along each of these curves produces the same output torque, some combinations will be associated with higher losses than others. Line 318 represents the most efficient operating point for each level of torque. However, it is not always possible to operate at this condition. Point 320 represents the current that would be induced in the windings by the permanent magnets in the rotor as the rotor spins at a particular speed if the three motor terminals were directly connected to one another as would happen with the inverter in a zero state. This may be called the short circuit current. The voltage applied by the inverter alters the winding current from this condition. Curve 322 represents the boundary of the conditions that are achievable by the inverter at a particular rotor speed and bus voltage level. At higher bus voltages or lower rotor speeds, the boundary expands as shown by curve 324.

Figure 1:
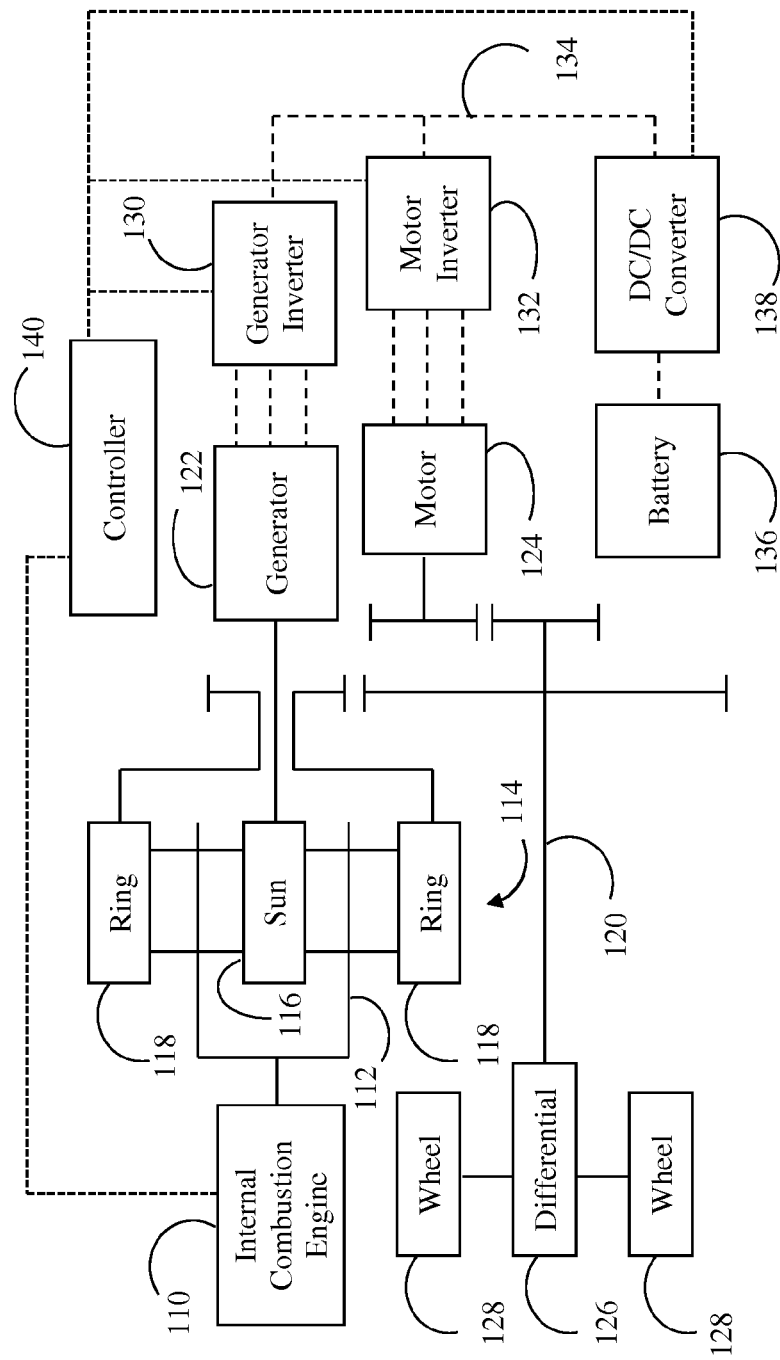
FIG. 1 is a schematic diagram of an exemplary hybrid electric powertrain.

Two basic control methods are known for switching among inverter states to regulate torque output of a PMSM. In the six-step method, the inverter cycles through the six non-zero states once per cycle of the rotor, producing an oscillating voltage and current in each winding. A rotor cycle is defined relative to motor poles and does not necessarily correspond to a complete revolution. The amplitude of the AC voltage is dictated by the DC voltage. The torque is dictated by the DC voltage, the rotor speed, and the phase difference between these quasi-sinusoidal AC voltage signals and the rotor position. A controller issues commands to the inverter indicating when to switch to the next state in the sequence. In six-step mode, the components of the winding current, $I_d$, and $I_q$, are located on a curve such as curve 122 or 124 in FIG. 1. The curve is determined by the bus voltage $V_{dc}$ and the rotor speed $\omega$. The position along the curve is determined by the voltage angle, $\Theta_V$. The controller adjusts $\Theta_V$ by adjusting the timing at which it switches the inverter to the next non-zero inverter states. The target voltage angle $\Theta^*_V$ is a non-linear function of the torque request, rotor speed, and bus voltage.

Figure 2:
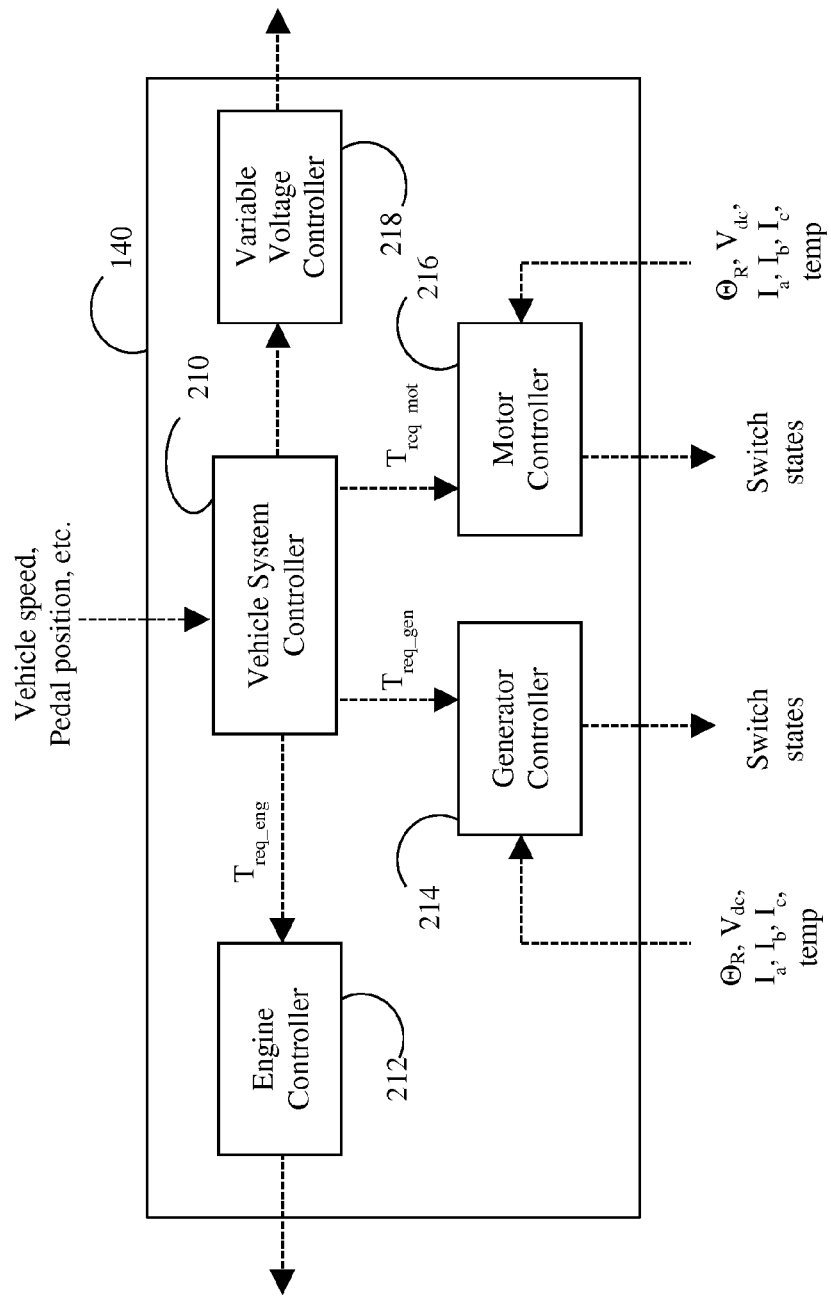
FIG. 2 is a controller schematic in an exemplary hybrid electric powertrain.

In the PWM method, the inverter switches very rapidly among two of the non-zero states and one of the zero states. A controller specifies what fraction of the time should be spent in each of these three states by specifying pulse width modulation (PWM) duty cycles. The controller updates these duty cycles at regular intervals such that the frequency of updates is significantly higher than the frequency of the rotor rotation. In PWM mode, the components of the winding current, $I_d$, and $I_q$, are located in a region bounded by a curve such as curve 122 or 124 in FIG. 2. As with the six-step method, the curve is determined by the bus voltage $V_{dc}$ and the rotor speed $\omega$, although the curve may be slightly inside the six-step curve for a particular $V_{dc}$ and $\omega$. The controller adjusts $I_d$ and $I_q$ by adjusting $V_d$ and $V_q$ using closed loop control. The controller then translates $V_d$ and $V_q$ into PWM duty cycle commands to the inverter based on the rotor position $\Theta_R$.

The target components of the winding current, $I^*_d$, and $I^*_q$, are non-linear functions of the torque request, rotor speed, and bus voltage. At low torque requests, low speeds, and high bus voltages, $I^*_d$ and $I^*_q$ are selected along the line 118 in FIG. 1 to yield the most efficient operation. However, at high torque requests, high speeds, and low bus voltages, operation along line 118 is not possible. The most efficient achievable operating point is located along a curve, such as 122, which represents the boundary of the operating region at the current rotor speed and bus voltage. This area of operation is called the field weakening region.

Two basic control methods are known for switching among inverter states to regulate torque output of a PMSM. In the six-step method, the inverter cycles through the six non-zero states once per cycle of the rotor, producing an oscillating voltage and current in each winding. A rotor cycle is defined relative to motor poles and does not necessarily correspond to a complete revolution. The amplitude of the AC voltage is dictated by the DC voltage. The torque is dictated by the DC voltage, the rotor speed, and the phase difference between these quasi-sinusoidal AC voltage signals and the rotor position. A controller issues commands to the inverter indicating when to switch to the next state in the sequence. In six-step mode, the components of the winding current, $I_d$, and $I_q$, are located on a curve such as curve 322 or 324 in FIG. 3. The curve is determined by the bus voltage $V_{dc}$ and the rotor speed $\omega$. The position along the curve is determined by the voltage angle, $\Theta_V$. The controller adjusts $\Theta_V$ by adjusting the timing at which it switches the inverter to the next non-zero inverter states. The target voltage angle $\Theta^*_V$ is a non-linear function of the torque request, rotor speed, and bus voltage.

In the PWM method, the inverter switches very rapidly among two of the non-zero states and one of the zero states. A controller specifies what fraction of the time should be spent in each of these three states by specifying pulse width modulation (PWM) duty cycles. The controller updates these duty cycles at regular intervals such that the frequency of updates is significantly higher than the frequency of the rotor rotation. In PWM mode, the components of the winding current, $I_d$, and $I_q$, are located in a region bounded by a curve such as curve 322 or 324 in FIG. 3. As with the six-step method, the curve is determined by the bus voltage $V_{dc}$ and the rotor speed $\omega$, although the curve may be slightly inside the six-step curve for a particular $V_{dc}$ and $\omega$. The controller adjusts $I_d$ and $I_q$ by adjusting $V_d$ and $V_q$ using closed loop control. The controller then translates $V_d$ and $V_q$ into PWM duty cycle commands to the inverter based on the rotor position $\Theta_R$.

The target components of the winding current, $I^*_d$, and $I^*_q$, are non-linear functions of the torque request, rotor speed, and bus voltage. At low torque requests, low speeds, and high bus voltages, $I^*_d$ and $I^*_q$ are selected along the line 318 in FIG. 3 to yield the most efficient operation. However, at high torque requests, high speeds, and low bus voltages, operation along line 318 is not possible. The most efficient achievable operating point is located along a curve, such as curve 322, which represents the boundary of the operating region at the current rotor speed and bus voltage. This area of operation is called the field weakening region.

Figure 4:
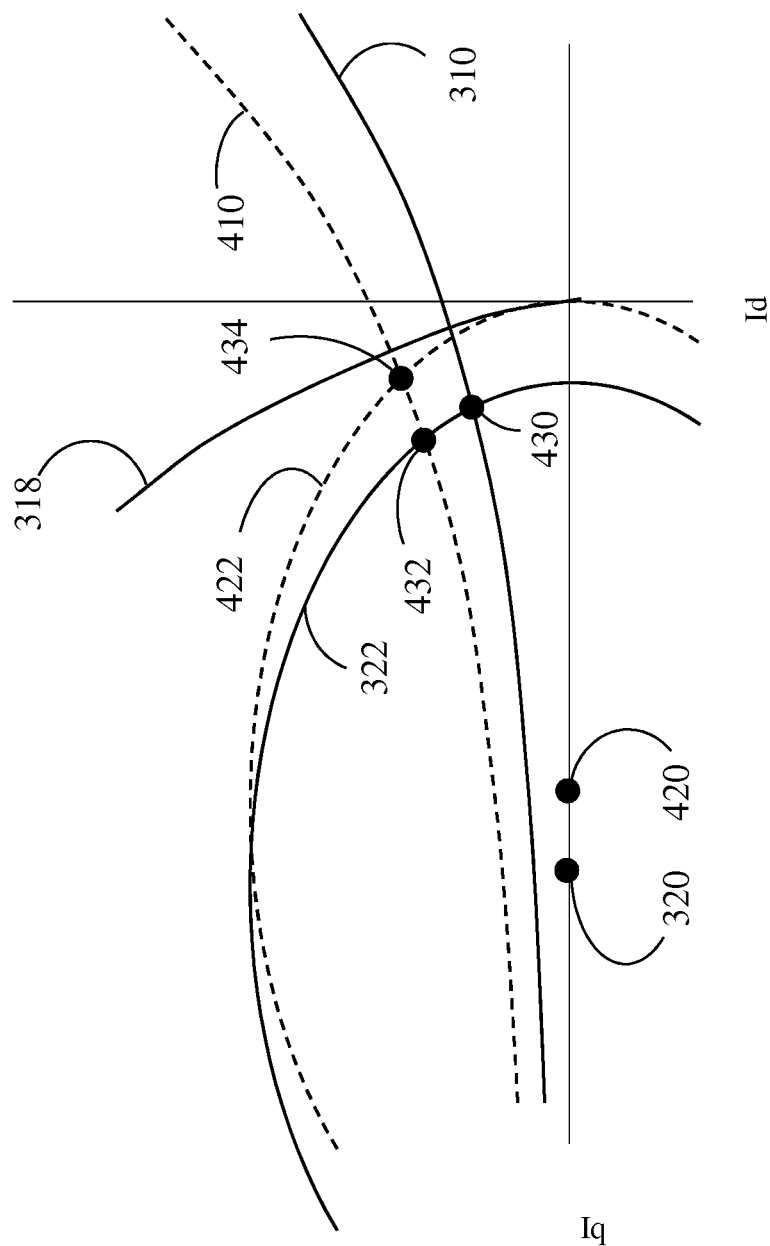
FIG. 4 is a graph of general characteristics of permanent magnet synchronous motors in terms of the direct and quadrature components of the winding current as temperature varies.

FIG. 4 illustrates the impact of temperature. At an elevated temperature above the reference temperature, the permanent magnets become weaker. At the reference temperature, line 310 represents the various combinations of $I_d$ and $I_q$ that generate a particular torque. At the higher temperature, this curve shifts to dotted line 410. Because the permanent magnets are weaker, the winding current must be higher to generate the same torque. Also, the short circuit current becomes less negative. Point 320 represents the short circuit current at the reference temperature while point 420 represents the short circuit current at the elevated temperature. Consequently, the operating region achievable at a given rotor speed and bus voltage also shift as indicated by curve 322 and dotted curve 422. At the reference temperature, the controller would respond to a request for the torque associated with curve 310 by selecting $I^*_d$ and $I^*_q$ for point 430. At the elevated temperature, one approach would be to add a value $\Delta T$ to the requested torque to compensate for the shift in the lines of constant torque. With this approach, the controller would select $I^*_d$ and $I^*_q$ for point 432. Although this would result in the desired torque, it would not select the most efficient operating point. Point 434, which also generates the desired torque at the elevated temperature, is closer to the maximum efficiency line 318 so it generates the torque more efficiently. If the simple approach of adjusting the requested torque is used to compensate for a decreased temperature, the resulting operating point would move outside the achievable region due to the leftward shift of this region. Consequently, the $I^*_d$ and $I^*_q$ table must be calibrated at the minimum operating temperature and the efficiency suffers at higher temperatures.

Figure 5:
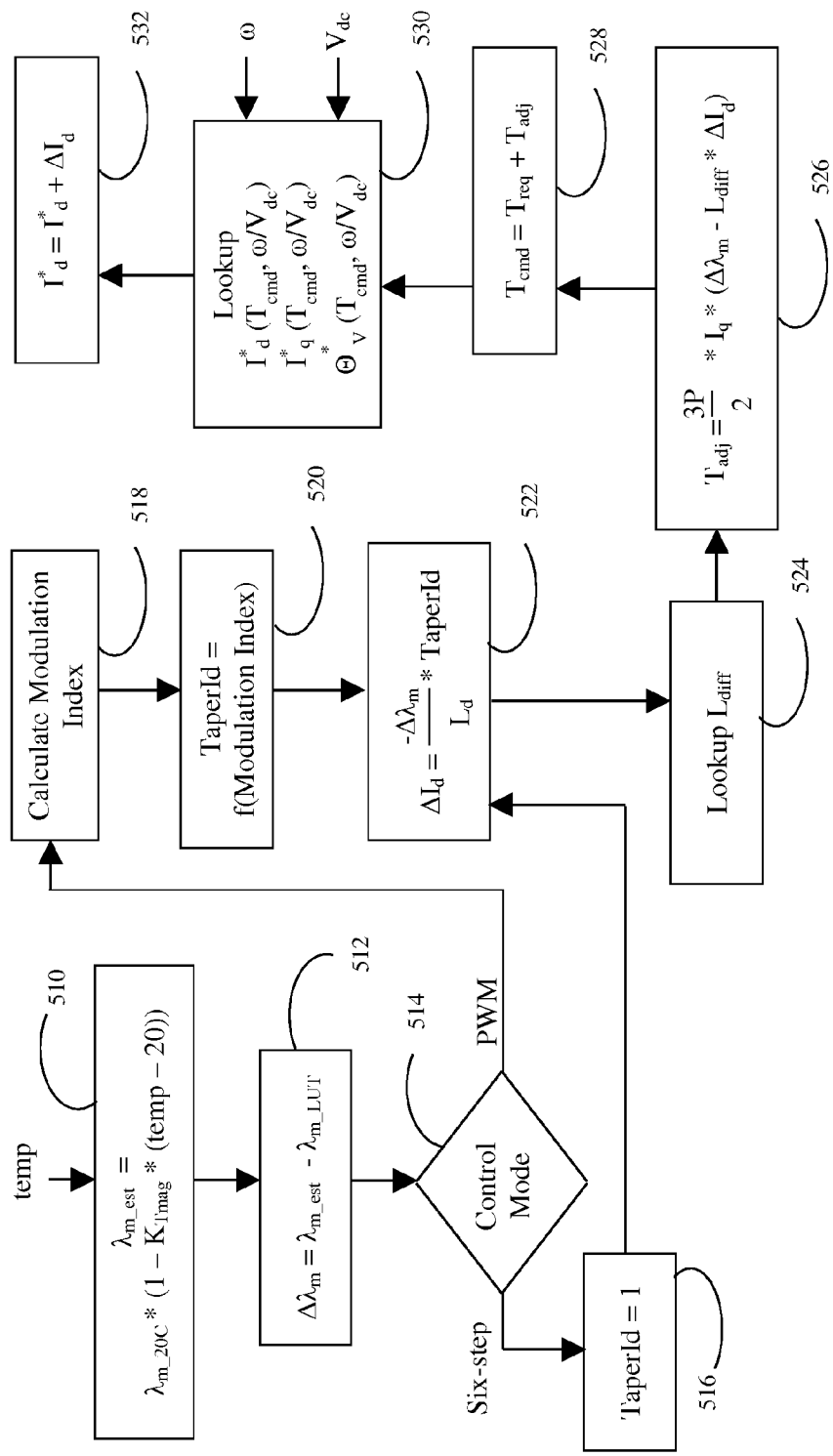
FIG. 5 is a flow chart for the control method for permanent magnet synchronous motors.

FIG. 5 illustrates a temperature compensation method that compensates for both the shift in the lines of constant torque and the shift in the achievable operating region. At 510, the controller computes an estimated magnetic flux, $\lambda_{m\_est}$, by scaling a known magnetic flux at 20 degrees Celsius based on a measured temperature. $K_{Tmag}$ is a calibratable constant. At 512, the controller calculates a change in magnetic flux, $\Delta\lambda_m$. Next, the controller calculates a parameter, TaperId that operates to limit the temperature adjustment when the motor is not operating on the boundary of the achievable region. When TaperId is equal to 1, the method fully compensates for the shift in the achievable region. However, when the motor is operating along line 318 far from the boundary of the achievable region, TaperId is set to 0. If the motor is operating in six-step mode, then TaperId is set to 1 at 516. If the motor is operating in PWM mode, then the modulation index is calculated at 518. At 520, TaperId is set to 0 if the modulation index is below a lower threshold, set to 1 if the modulation index is above an upper threshold, and set to an intermediate value if it is between these thresholds. At 522, the controller computes $\Delta I_d$. If TaperId is equal to 1, then $\Delta I_d$ is the change in the winding current induced by the rotor. At 524, the controller looks up $L_{diff}$, the inductance difference between the quadrature and direct axes, in a table. Next, the controller calculates a torque request adjustment, $T_{adj}$, using a formula at 526. Here, the measured value of $I_q$ is used. P is the number of pole pairs in the motor. At 528, the torque adjustment is added to the requested torque. At 530, the controller looks up torque control parameters $I^*_d$, $I^*_q$, and $\Theta^*_V$ based on the adjusted torque command, the rotor speed $\omega$, and the bus voltage $V_{dc}$. Finally, at 532, the controller adds $\Delta I_d$ to $I^*_d$. If $I^*_d$ is negative, then increasing $I^*_d$ makes $I^*_d$ less negative and decreasing $I^*_d$ makes $I^*_d$ more negative.

What is claimed is:

1. A vehicle comprising:
   a bus;
   an electric machine having a temperature;
   an inverter configured to supply the electric machine a winding current having a direct component (Id) and a quadrature component (Iq); and
   a controller configured to issue pulse width modulation commands to the inverter to adjust the winding current such that for a given speed and torque of the electric machine and voltage of the bus, the direct component increases as the temperature increases.

2. The vehicle of claim 1 wherein the controller is further configured to operate the inverter in a six-step mode wherein the winding current is adjusted by adjusting a voltage angle such that for a given speed and torque of the electric machine and voltage of the bus, the voltage angle varies as the temperature varies.

3. The vehicle of claim 1 wherein the direct component of the winding current is less than zero at the given speed, torque, and voltage.

4. The vehicle of claim 1 wherein the given speed is greater than zero.

5. A controller comprising:
   an input interface configured to receive signals indicating a voltage of an electrical bus and a temperature and a rotor speed of an electric machine;
   an output interface configured to send pulse width modulation commands to an inverter such that the inverter supplies the electric machine with a winding current having a direct component (Id) and a quadrature component (Iq), the winding current causing the electric machine to produce a torque; and
   control logic programmed to adjust the pulse width modulation commands such that for a given rotor speed, bus voltage, and torque, the direct component increases as the temperature increases.

6. The controller of claim 5 wherein the direct component of the winding current is less than zero at the given rotor speed, bus voltage, and torque.

7. The controller of claim 5 wherein the given rotor speed is greater than zero.

8. A method of operating an electric machine having a temperature, the method comprising:
   receiving a torque request;
   adjusting the torque request based on the temperature;
   calculating a direct component (Id) and a quadrature component (Iq) of a target winding current based on the adjusted torque request;
   adjusting the calculated direct component based on the temperature; and
   issuing commands to an inverter to supply a winding current generally equal to the adjusted target winding current.

9. The method of claim 8 wherein the calculated direct component of the winding current is not adjusted based on temperature when the torque request is less than a threshold.

10. The method of claim 9 wherein the threshold is based on a rotor speed of the electric machine.

11. The method of claim 10 wherein the threshold is also based on a bus voltage of the inverter.

12. The method of claim 8 wherein the direct component and quadrature component are based on a rotor speed of the electric machine.

13. The method of claim 12 wherein the direct component and quadrature component are also based on a bus voltage of the inverter.

* * * * *